US008469717B2

(12) United States Patent
Park et al.

(10) Patent No.: US 8,469,717 B2
(45) Date of Patent: Jun. 25, 2013

(54) BLOOD VESSEL MODEL FOR MEDICAL TRAINING AND METHOD FOR MANUFACTURING SAME

(75) Inventors: Young Kwang Park, Totsuka-machi (JP); Mitsuo Umezu, Totsuka-machi (JP)

(73) Assignee: EBM Corporation, Tokyo (JP)

( * ) Notice: Subject to any disclaimer, the term of this patent is extended or adjusted under 35 U.S.C. 154(b) by 55 days.

(21) Appl. No.: 13/257,610

(22) PCT Filed: Mar. 20, 2009

(86) PCT No.: PCT/JP2009/055537
§ 371 (c)(1),
(2), (4) Date: Nov. 3, 2011

(87) PCT Pub. No.: WO2010/106691
PCT Pub. Date: Sep. 23, 2010

(65) Prior Publication Data
US 2012/0040323 A1    Feb. 16, 2012

(51) Int. Cl.
*G09B 23/28* (2006.01)
(52) U.S. Cl.
USPC .......................................................... 434/268
(58) Field of Classification Search
USPC .................. 434/262, 267, 268, 272
See application file for complete search history.

(56) References Cited

U.S. PATENT DOCUMENTS

| | | | | |
|---|---|---|---|---|
| 2,704,897 A * | 3/1955 | Lade | ............................... | 434/272 |
| 4,198,766 A * | 4/1980 | Camin | ........................... | 434/272 |
| 5,320,537 A * | 6/1994 | Watson | .......................... | 434/272 |
| 6,517,354 B1 * | 2/2003 | Levy | ............................... | 434/262 |
| 7,008,232 B2 * | 3/2006 | Brassel | .......................... | 434/268 |
| 7,255,565 B2 * | 8/2007 | Keegan | .......................... | 434/272 |
| 7,993,140 B2 * | 8/2011 | Sakezles | ........................ | 434/267 |
| 8,241,042 B2 * | 8/2012 | Rosenthal et al. | ............ | 434/268 |

(Continued)

FOREIGN PATENT DOCUMENTS

| | | |
|---|---|---|
| JP | 11-167342 A | 6/1999 |
| JP | 2005-202267 A | 7/2005 |

(Continued)

OTHER PUBLICATIONS

"Igaku Kyoikuyo Simulator lryo Gijutsu Training Simulator," Nippon Riaot Sabisu Kabushiki Kaisha, Feb. 20, 2007, pp. 112-114.

(Continued)

*Primary Examiner* — Kurt Fernstrom
(74) *Attorney, Agent, or Firm* — Westerman, Hattori, Daniels & Adrian, LLP

(57) ABSTRACT

A blood vessel model for medical training not deforming with time and approximated to a real blood vessel without using any other tool when the blood vessel wall of the simulated blood vessel is incised or cut off. The blood vessel model 10 includes a simulated blood vessel 11 simulating a blood vessel and artificially fabricated and a base 12 supporting the simulated blood vessel 11. The simulated blood vessel 11 has a circumferentially exposed part and the other part buried in the base 12. The base 12 has a jointed part 24 disposed in a position below the simulated blood vessel 11 and formed by joining forming edges 26A, 26A of a cutout 26 extending along the simulated blood vessel 11 to impart a tensile stress in the diameter-increasing direction to the simulated blood vessel 11.

4 Claims, 8 Drawing Sheets

U.S. PATENT DOCUMENTS

| | | | |
|---|---|---|---|
| 2008/0118902 A1* | 5/2008 | Matsumura | 434/272 |
| 2010/0196867 A1* | 8/2010 | Geerligs et al. | 434/272 |
| 2011/0117531 A1* | 5/2011 | Iwasaki et al. | 434/272 |
| 2011/0281251 A1* | 11/2011 | Mousques | 434/274 |

FOREIGN PATENT DOCUMENTS

| | | | |
|---|---|---|---|
| JP | 2007-316343 A | 12/2007 | |
| JP | 2008-241988 A | 10/2008 | |
| JP | 2008-261990 A | 10/2008 | |

OTHER PUBLICATIONS

International Search Report of PCT/JP2009/055537, mailing date Apr. 28, 2009.

* cited by examiner (A)

(B)

(A)

(B)

(C)

BLOOD VESSEL MODEL FOR MEDICAL TRAINING AND METHOD FOR MANUFACTURING SAME

TECHNICAL FIELD

The present invention relates to a blood vessel model for medical training and a method for manufacturing the same, and more specifically relates to a blood vessel model useful for training for various procedures for a blood vessel in, e.g., a surgery, and a method for manufacturing the same.

BACKGROUND ART

The cardiovascular surgery is a field in which a surgical error is highly likely to be a direct cause of an operational death, and thus, requires high skills in an operation. One of such cardiovascular surgeries is a coronary-artery bypass surgery. A coronary-artery bypass surgery is a surgical technique in which when a part of coronary arteries extending around a heart is narrowed, a peripheral side of the narrowed part and another blood vessel part are connected by an alternative blood vessel called a graft to ensure blood flow.

For young doctors, it is difficult to gain experience in clinical practice, and thus, for improvement in the aforementioned surgical skills (techniques), an environment enabling efficient training is required. Here, as an example of training for improving the techniques of young surgeons, there is a training using a heart of a pig as a heart of a human, which is conducted under supervision of a skilled surgeon. However, such training using an organ of an animal is troublesome in storage and problematic not only from a hygiene perspective but also in ethics because of use of a living tissue. Accordingly, due to such problems, there is a demand for using not a living tissue but an artificial training tool for aforementioned technique training.

There is a known blood vessel model formed by implanting a simulated blood vessel in a position close to a front surface of a gelatinous object simulating a tissue of an animal (see patent document 1). This blood vessel model is intended for use in practicing a technique to insert an injection needle or a blood collection needle.

However, where the blood vessel model according to patent document 1 is used for training for coronary-artery bypass surgery, such training cannot be conducted in realistic conditions. In other words, a real blood wall is consistently subject to an inner pressure caused by a blood pressure in a physiological state, and for balance with the inner pressure, a stress exists in the blood vessel tissue. Thus, in performing an anastomosis, a front surface of a blood vessel wall is incised in a direction of the axis of the blood vessel, and the incised part swiftly expands in a circumferential direction of the blood wall. However, in the blood vessel model, as opposed to a real blood vessel, no such stress exists in the simulated blood vessel, and thus, even if a blood vessel wall of the simulated blood vessel is incised, a mere slit is formed, and no force that expands the slit in the circumferential direction acts thereon. In other words, in a real operation, procedures such as sewing, ligation and anastomosis are performed in a state in which an incised part of a blood vessel is expanded, and thus, it is difficult to conduct training close to a real situation if the blood vessel model is used as it is. Therefore, for performing a training close to a real situation using the blood vessel model, a tool for expanding an incised part of a blood vessel is separately required, and also adjustment of the tool to provide a proper expansion condition is required, disabling doctors or medical students to easily perform procedure trainings.

Therefore, the present inventors already proposed a blood vessel model that can be approximated to a real blood vessel without using any other tool when a simulated blood vessel is incised (see patent document 2). As illustrated in FIG. 7, such blood vessel model 50 includes an artificially-formed simulated blood vessel 51, and a base 52 supporting the simulated blood vessel 51. The base 52, which is a laminated body obtained by putting two upper and lower layers of elastic material together, includes an upper first member 54 in which a part of a simulated blood vessel 51 is buried, and a second member 55 put on a lower side of the first member 54. In the first member 54, a tensile stress in a direction in which a diameter of the simulated blood vessel 51 increases. Accordingly, when a blood vessel wall of the simulated blood vessel 51 is incised in a direction of an axis of the simulated blood vessel 51, the simulated blood vessel 51 is swiftly opened in a circumferential direction thereof.

The blood vessel model 50 is manufactured according to the procedure illustrated in FIG. 8. In other words, as illustrated in FIG. 8(A), while left and right sides of the first member 54 being flexed downward in the Figure, the bottom surface thereof is bonded to the upper surface of the second member 55 in the Figure along the upper surface, and consequently, as illustrated in FIG. 8(B), a tensile stress directed outward, which is the horizontal direction in the Figure, is generated inside the first member 54. As a result, the tensile stress in the diameter-increasing direction is imparted to the simulated blood vessel 51.

Patent Document 1: Japanese Patent Laid-Open No. 11-167342

Patent Document 2: Japanese Patent Laid-Open No. 2007-316343

DISCLOSURE OF THE INVENTION

Problems to be Solved by the Invention

However, in the aforementioned blood vessel model 50 according to patent document 2, the entire first member 54 is bonded to the second member 55 in a state in which the first member 54 is flexed at a center part of the first member 54 where the simulated blood vessel 51 is present, resulting in the tensile stress acting on the entire region of the first member 54, which may cause a deformation resulting from the blood vessel model 50 rolling back with time as illustrated in FIG. 8(C). Upon occurrence of such deformation, not only the commodity value is lowered, but also the tensile stress in the first member 54 becomes smaller than the original one, and thus, an intended opened state of the simulated blood vessel 51 may be unable to obtained when the blood vessel wall of the simulated blood vessel 51 is incised in the direction of the axis thereof.

Furthermore, when a blood vessel in a particular site such as a cerebral blood vessel is cut off in a direction across the axis, a tensile force by which two blood vessels separated from each other at the cut part move away from each other in the direction of the axis is exerted thereon. However, in the blood vessel model 50, such tensile force cannot be exerted on the blood vessel when the blood vessel is cut off, and thus, a training close to a real situation cannot be conducted when the blood vessel model 50 is employed for a training for a procedure involving cut-off of, e.g., a cerebral blood vessel.

The present invention has been made in view of such problems, and an object of the present invention is to provide a blood vessel model for medical training that does not deform with time and can be approximated to a real blood vessel without using other tool when a blood vessel wall of a simulated blood vessel is incised or cut off.

Means for Solving the Problems (1) In order to achieve the above object, the present invention provides a blood vessel model for medical training including a simulated blood vessel artificially formed so as to simulate a blood vessel, and a base supporting the simulated blood vessel, wherein the simulated blood vessel includes an exposed circumferential part and another circumferential part buried in the base;

the base includes a jointed part disposed at a position below the simulated blood vessel; and the jointed part is formed by jointing forming edges of a cutout extending along the simulated blood vessel to impart a tensile stress in a diameter-increasing direction to the simulated blood vessel.

(2) Also, a blood vessel model for medical training according to the present invention includes a simulated blood vessel artificially formed so as to simulate a blood vessel, and a base supporting the simulated blood vessel and including a groove that opens on a front surface side thereof, wherein the simulated blood vessel is disposed so as to straddle over an open space of the groove, and includes an exposed circumferential part and another circumferential part buried in the base;

the base includes a jointed part disposed at a position below the simulated blood vessel; and the jointed part is formed by jointing forming edges of a cutout extending in a direction across the simulated blood vessel to impart a tensile stress in an extending direction to the simulated blood vessel.

(3) Furthermore, the present invention provides a method for manufacturing a blood vessel model for medical training including a simulated blood vessel artificially formed so as to simulate a blood vessel, and a base supporting the simulated blood vessel, the method including:

exposing a circumferential part of the simulated blood vessel and burying another circumferential part of the simulated blood vessel in the base; and jointing forming edges of a cutout extending in the base below the simulated blood vessel along the simulated blood vessel to make the simulated blood vessel enter a state in which a tensile stress in a diameter-increasing direction is imparted thereto.

(4) Furthermore, the present invention provides a method for manufacturing a blood vessel model for medical training including a simulated blood vessel artificially formed so as to simulate a blood vessel, and a base supporting the simulated blood vessel and including a groove that opens on a front surface side thereof, the method including:

exposing a circumferential part of the simulated blood vessel and burying another circumferential part of the simulated blood vessel in the base to dispose the simulated blood vessel so as to straddle over an open space of the groove; and jointing forming edges of a cutout extending in the base below the groove in a direction across the simulated blood vessel to make the simulated blood vessel enter a state in which a tensile stress in an extending direction is imparted thereto.

Unless expressly stated otherwise, "upper, up or vertical (top/bottom direction)", "lower, down or vertical (top/bottom direction)", "left or horizontal (left/right direction)" and "right or horizontal (left/right direction)" in the present description and claims mean "upper, up or vertical (top/bottom direction)", "lower, down or vertical (top/bottom direction)", "left or horizontal (left/right direction)" and "right or horizontal (left/right direction)" with reference to the direction of the blood vessel model in FIG. 2.

Advantages of the Invention

According to the present invention, jointing of the forming edges of the cutout enables a tensile stress to be intensively imparted to the simulated blood vessel positioned above the jointed part of the cutout, and thus, can make it difficult to cause a temporal deformation of the entire blood vessel model. Furthermore, mutual jointing of the forming edges of the cutout provides a structure in which a tensile stress is imparted to the simulated blood vessel, enabling easy manufacture of the blood vessel model compared to the conventional structure in which the entire base is deformed to impart such tensile stress. Furthermore, adjustment of the width and/or depth of the cutout enables fine adjustment of a tensile stress acting on the blood vessel wall.

In particular, the invention according to (1) and (3) above, a tensile stress existing inside the simulated blood vessel enables occurrence of a phenomenon approximated to a real phenomenon, in which when the blood vessel wall of the simulated blood vessel is incised, the incised part is expanded in the circumferential direction.

Furthermore, the invention according to (2) and (4) above, a tensile stress existing inside the simulated blood vessel enables occurrence of a phenomenon close to a real phenomenon, in which when the simulated blood vessel is cut off, two blood vessels separated from each other at the cut part move away from each other in a direction of an axis thereof.

MODES FOR CARRYING OUT THE INVENTION

Hereinafter, embodiments of the present invention will be described with reference to the drawings.

First Embodiment

Figure 1:
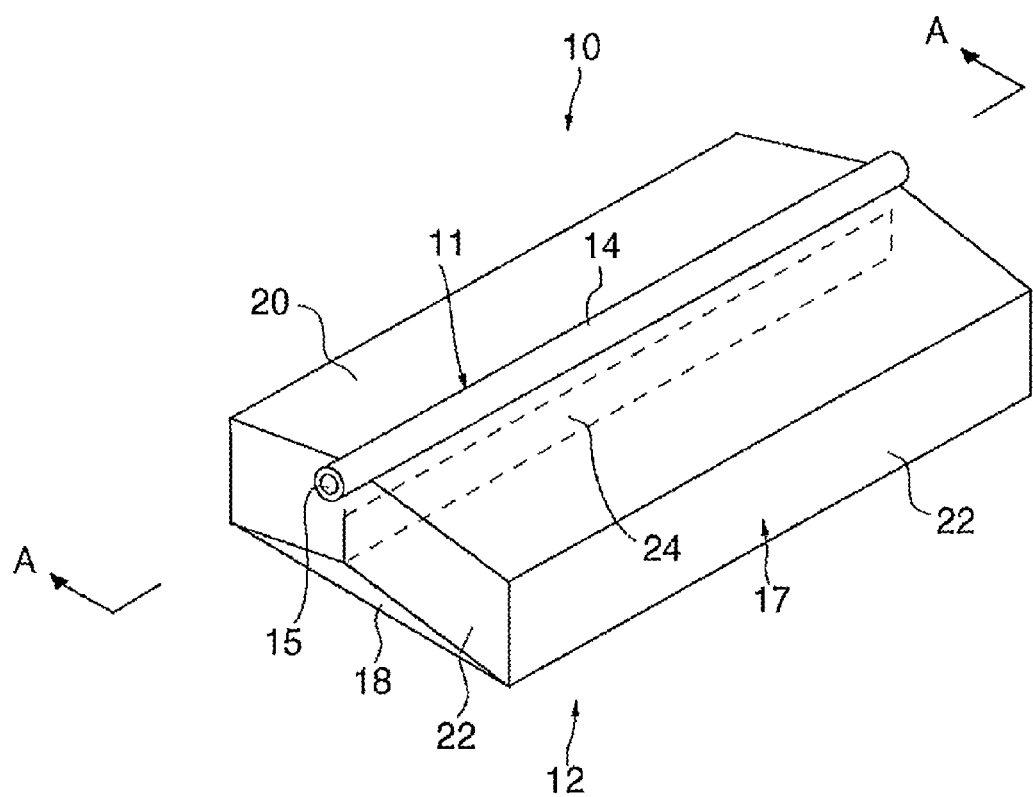
FIG. 1 is a schematic perspective view of a blood vessel model according to a first embodiment.
Figure 2:
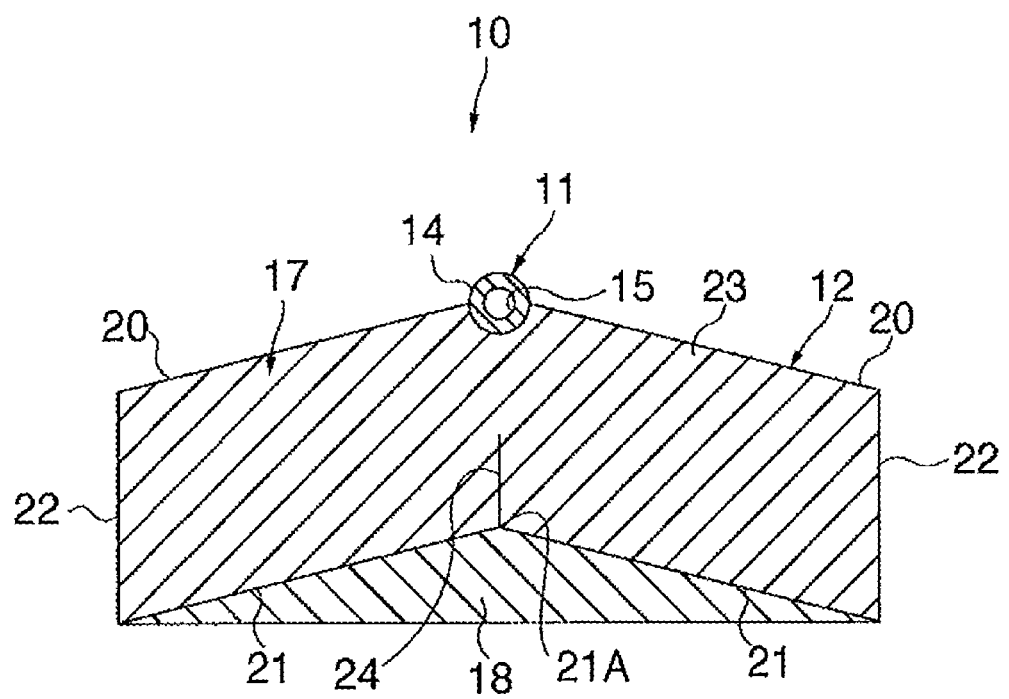
FIG. 2 is a cross-sectional diagram along line A-A in FIG. 1.

FIG. 1 is a schematic perspective view of a blood vessel model for medical training according to the present embodiment, and FIG. 2 is a cross-sectional diagram along line A-A in FIG. 1. In the Figures, a blood vessel model 10, which is used for training for a coronary-artery bypass surgery, includes a simulated blood vessel 11 artificially formed so as to simulate a coronary artery, the simulated blood vessel 11 substantially linearly extending, and a base 12 supporting the simulated blood vessel 11, the base 12 corresponding to a part of a cardiac muscle. The usage of the blood vessel model 10 is not limited to training for a coronary-artery bypass surgery, and the blood vessel model 10 can be used for training for improving skills for other blood vessel treatments including blood vessel anastomosis procedures in general.

The simulated blood vessel 11 is formed in a tubular shape by a predetermined elastic material such as silicone. The simulated blood vessel 11 includes a blood vessel wall 14 having an elasticity and a tearing strength set to be comparable to those of a real blood vessel, and an inner space 15 thereof. Furthermore, the simulated blood vessel 11 is disposed at a center position in a horizontal direction on an upper end side of the base 12 so as to extend in a direction orthogonal to the plane of the page of FIG. 2, and includes an exposed circumferential part and another circumferential part buried in the base 12.

Although the blood vessel wall 14 is not specifically limited, the blood vessel wall 14 has a triple-layer structure in which at least two layers are colored in different colors, and when the blood vessel wall 14 is incised, a contrast such as one appearing in a real blood vessel anastomosis is expressed. Furthermore, a tensile stress acts on the blood vessel wall 14 in a direction in which an inner diameter thereof increases (diameter-increasing direction).

The base 12 is a laminated body of a solid block shape made of a predetermined elastic material such as silicone. The base 12 includes an upper first member 17 in which a substantially lower half of the simulated blood vessel 11 is buried, and a second member 18 put on a lower side in the Figure of the first member 17.

Although the first member 17 is not specifically limited, the first member 17 is provided in the form of a mound in cross section. In other words, the first member 17 includes a front surface 20 positioned at an upper end side thereof, a back surface 21 positioned at a lower end side thereof, end surfaces 22 connecting to respective edges of the front surface 20 and the back surface 21, an inner region 23 surrounded by the surfaces 20 to 22, and a jointed part 24 extending from the back surface 21 to the inside of the inner region 23 in the vertical direction in the Figure.

Although the front surface 20 is not specifically limited, the front surface 20 includes substantially-planar inclined surfaces extending obliquely downward from the left and right sides of the simulated blood vessel 11 toward the end surfaces 22 and 22.

The back surface 21 includes substantially-planar inclined surfaces extending obliquely downward from an apex 21A positioned right below an axis of the simulated blood vessel 11 toward the end surfaces 22 and 22 on the left and right sides.

Figure 3:
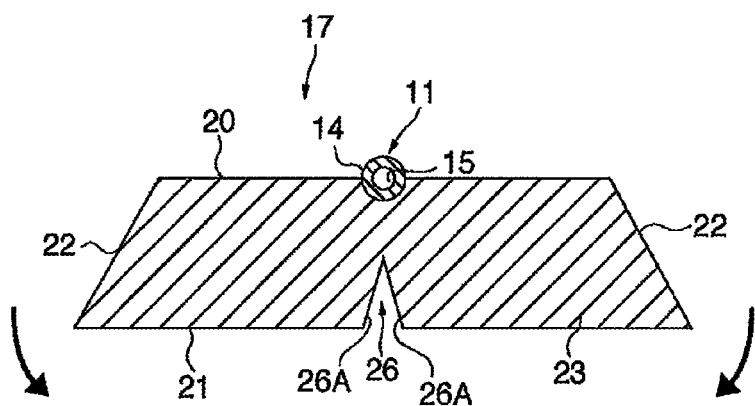
FIG. 3(A) is a cross-sectional diagram illustrating a state of a first member before bonding during manufacture of the blood vessel model.
FIG. 3(B) is a cross-sectional diagram illustrating a state of the first member and a second member when the first member and the second member are bonded together.
Figure 3:
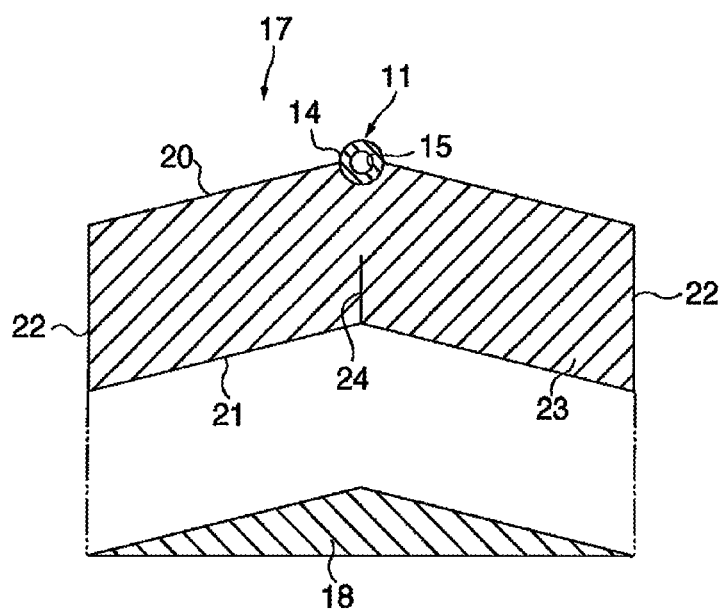

The jointed part 24 extends from the apex 21A to a position inside the inner region 23 in a substantially vertical direction. The jointed part 24 is formed from an initial shape of the first member 17, which is illustrated in FIG. 3(A). In other words, the first member 17 in the initial shape includes a wedge-shaped cutout 26 having an apex positioned substantially right below the axis of the simulated blood vessel 11, at a substantially center position in the horizontal direction of the back surface 21, in a state in which the simulated blood vessel 11 is buried. The cutout 26 extends through the first member 17 along the axis of the simulated blood vessel 11 in a direction orthogonal to the plane of the page of FIG. 3(A). Then, forming edges 26A of the cutout 26 are jointed to each other, enabling the jointed part 24 illustrated in FIG. 3(B) to be obtained.

Although the second member 18 is not specifically limited, the second member 18 is provided in the formed of a triangular prism, and an upper surface thereof in FIG. 3(B) has a surface shape substantially identical to the surface shape of the back surface 21 of the first member 17.

The blood vessel model 10 is formed by bonding the first member 17 and the second member 18 together according to the following procedure.

First, a lower half of the simulated blood vessel 11 is buried in the first member 17, and then, as illustrated in FIG. 3(A), while flexing the left and right end sides of the first member 17 downward, the forming edges 26A and 26A of the cutout 26 are jointed via, e.g., silicone, to form the jointed part 24 in the inner region 23 as illustrated in FIG. 3(B). Next, the back surface 21 of the first member 17 is jointed to the upper surface of the second member 18 via an adhesive such as silicone, thereby the first member 17 and the second member 18 being bonded together to provide the base 12. As a result of the jointing of the forming edges 26A of the cutout 26 positioned right below the axis of the simulated blood vessel 11, a tensile stress in the diameter-increasing direction intensively acts on the blood vessel wall 14 of the simulated blood vessel 11 supported by the base 12.

The simulated blood vessel 11 of the blood vessel model 10 obtained as described above is secured to the base 12 in a state in which the tensile stress acts inside the blood vessel wall 14, and thus, when a trainee such as a doctor or a medical student incises the simulated blood vessel 11, the incised part is expanded promptly, enabling provision of an incision situation close to an actual blood vessel incision situation.

Accordingly, such embodiment enables training for a blood vessel procedure involving incision to be conducted without using a specific tool for opening a blood vessel under a condition close to a real condition. Furthermore, adjustment of the width and/or depth of the cutout 26 enables fine adjustment of the tensile stress acting on the blood vessel wall 14. Furthermore, in the blood vessel model 10, as a result of the jointing of the forming edges 26A of the cutout 26, the tensile stress intensively acts on the simulated blood vessel 11, and thus, the work for bonding the first member 17 and the second member 18 together can be performed more easily compared to the conventional structure in which a stress acts on the entire first member, enabling enhancement of the productivity of the blood vessel model 10.

In the above embodiment, the shapes of the first member 17 and the second member 18 are not limited to the ones described above, and various shapes can be employed as long as the jointed part 24 resulting from jointing the forming edges 26A and 26A of the cutout 26 extending below the simulated blood vessel 11 along the simulated blood vessel 11 is formed. For example, it is possible that the front surface 20 around the simulated blood vessel 11 has a curved shape like a surface of a heart when the first member 17 and the second member 18 are bonded together. Consequently, an operative training using a cardiac muscle fixation tool such as a stabilizer like in clinical practice can be conducted.

Furthermore, the base 12 is not limited to the aforementioned bilayer structure, the second member 18 may be omitted or the base 12 can have a structure including three or more layers.

Next, another embodiment of the present invention will be described. In the following description, components that are the same as or equivalent to those of the first embodiment are provided with the same reference numerals as those of the first embodiment, and a description thereof will be omitted or simplified.

Second Embodiment

Figure 4:
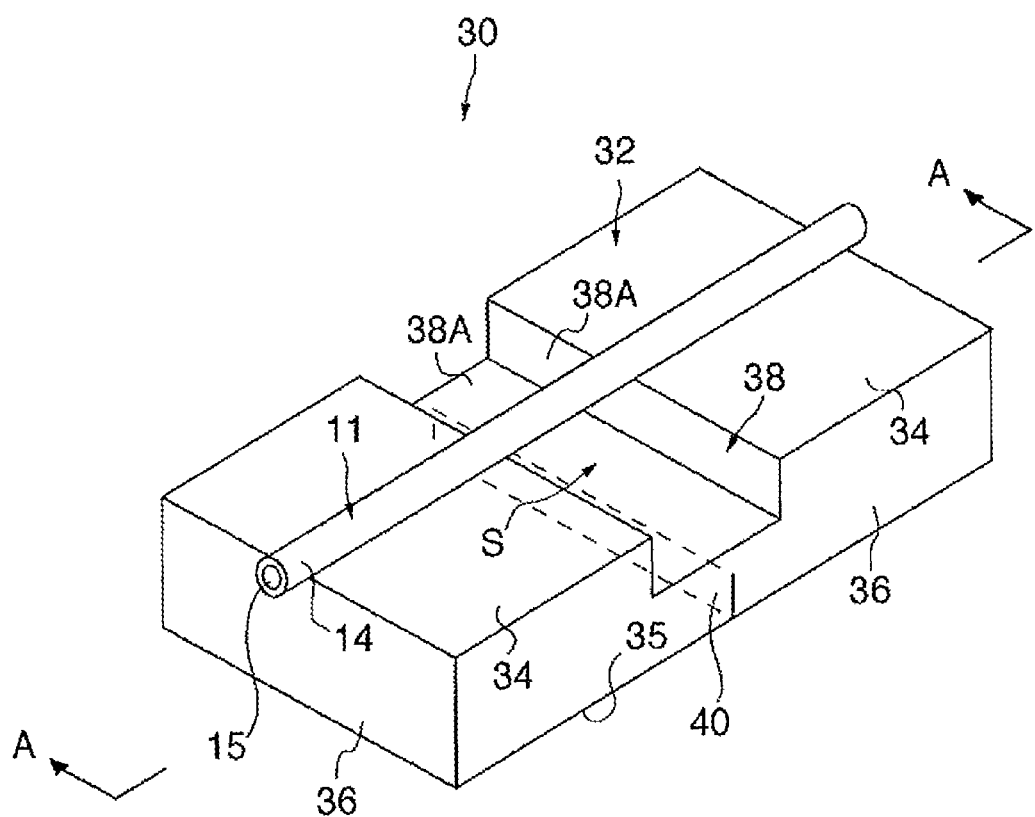
FIG. 4 is a schematic perspective view of a blood vessel model according to a second embodiment.
Figure 5:
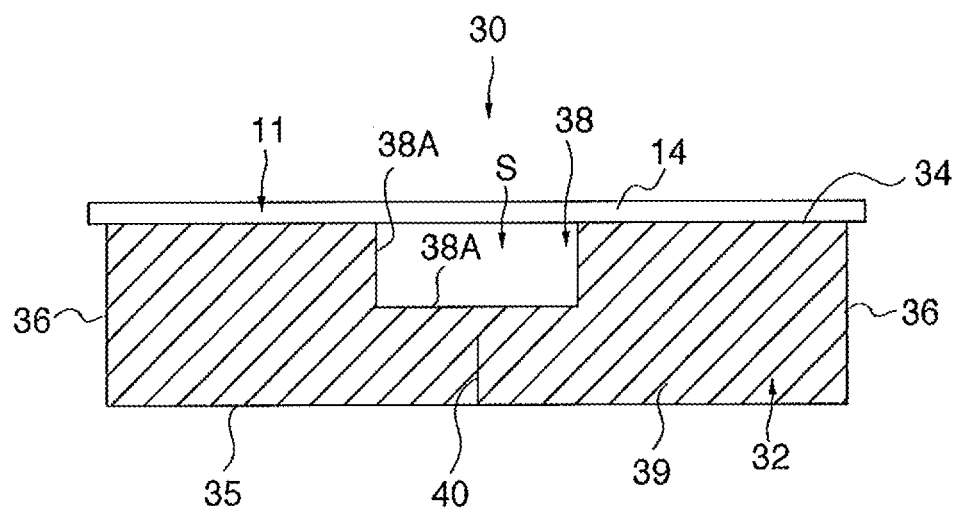
FIG. 5 is a cross-sectional diagram along line A-A in FIG. 4.

A blood vessel model 30 according to the present embodiment, which is illustrated in FIGS. 4 and 5, is intended for use in, e.g., training for cutting off a cerebral blood vessel and suturing the cut part and characterized in that a tensile stress acts along a direction of an axis of a simulated blood vessel 11 in a direction in which the simulated blood vessel 11 extends (the extending direction).

In other words, a base 32 of the blood vessel model 30 according to the present embodiment includes a block body having a substantially concave shape. The base 32 includes a front surface 34 positioned on the upper end side, a back surface 35 positioned on the lower end side, end surfaces 36 connecting to respective edges of the front surface 34 and the back surface 35, a groove 38 with its front surface 34 side open, the groove 38 being concave toward the back surface 35 side and extending in a direction across the simulated blood vessel 11, an inner region 39 surrounded by the surfaces 34 to 36 and forming surfaces 38A of the groove 38, and a jointed part 40 vertically extending between the back surface 35 and the inside of the inner region 39.

The groove 38 is provided in the form of a concave shape by forming an open space S at a substantially center part of the base 32, and a lower half of the simulated blood vessel 11 is buried in the base 32 on the front surface 34 side so as to straddle over the open space S. Accordingly, the simulated blood vessel 11 is in a state in which the opposite end sides thereof in a direction in which the simulated blood vessel 11 extends are supported by the base 32, and a center part thereof floats over the open space S. The configuration and material of the simulated blood vessel 11 and the material of the base 32 are similar to those of the above-described first embodiment.

Not only the front surface 34 side of the open space S, but also the opposite end sides of the open space S in a direction substantially orthogonal to the direction of the axis of the simulated blood vessel 11 that is the direction in which the simulated blood vessel 11 extends, that is, a direction in which the groove 38 extends are opened.

Figure 6:
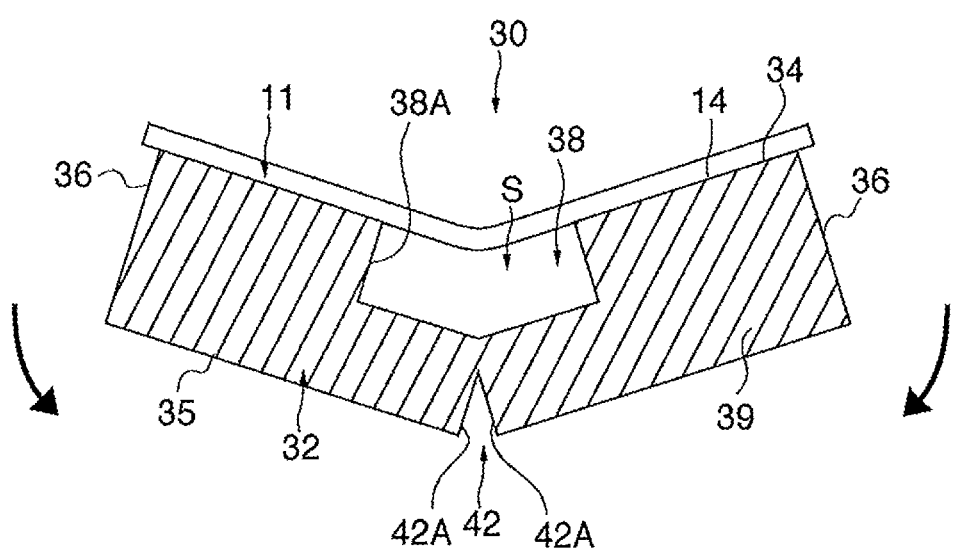
FIG. 6 is a cross-sectional diagram illustrating jointing of forming edges of a cutout during manufacture of the blood vessel model according to the second embodiment.
Figure 7:
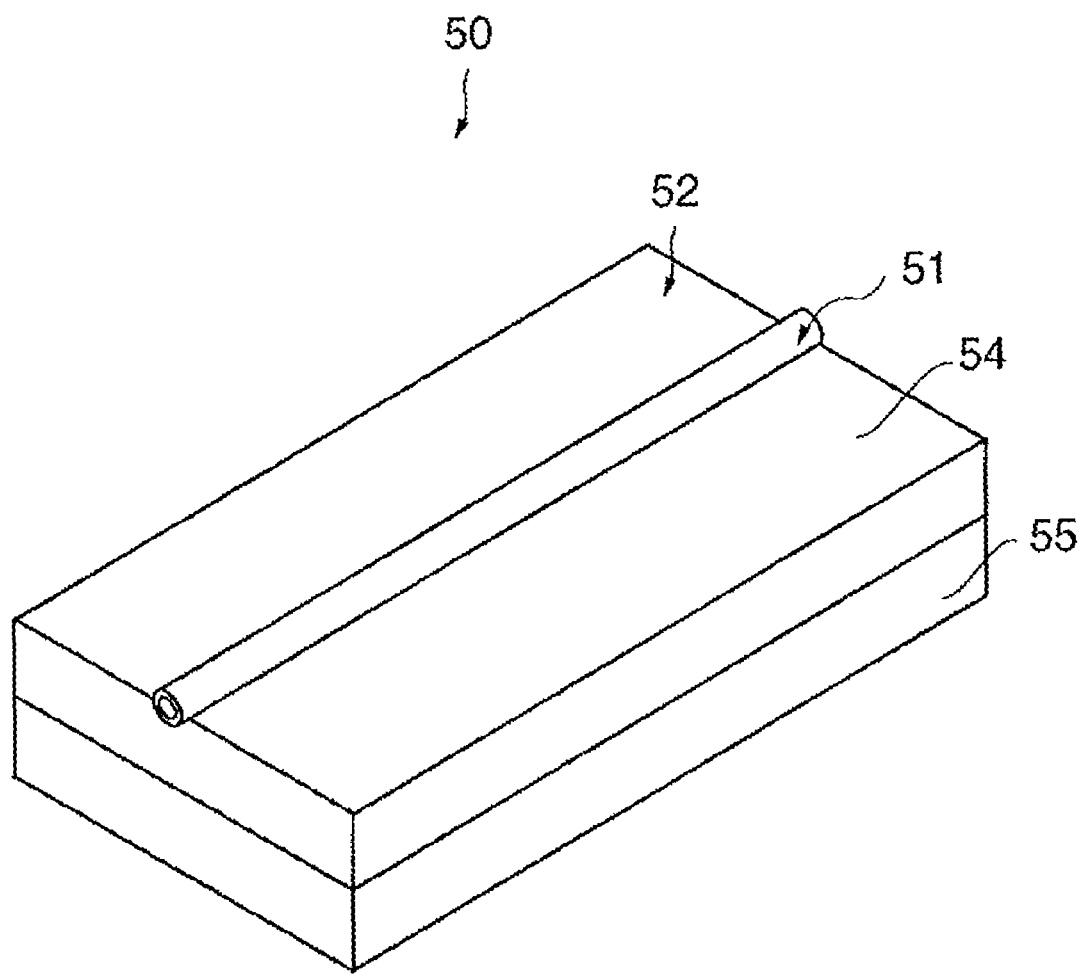
FIG. 7 is a schematic perspective view of a blood vessel model according to a conventional example.
Figure 8:
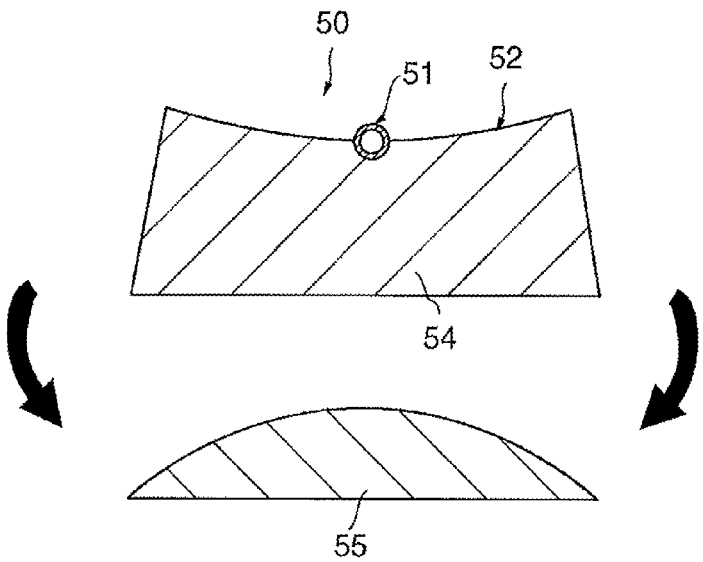
FIG. 8(A) is a cross-sectional diagram illustrating a state of the blood vessel model according to the conventional example before first and second members being bonded together.
FIG. 8(B) is a cross-sectional diagram illustrating a state in which the first and second members have been bonded together from the state in FIG. 8(A)
FIG. 8(C) is a cross-sectional diagram illustrating a state in which the blood vessel model has deformed with time from the state in FIG. 8(B).
Figure 8:
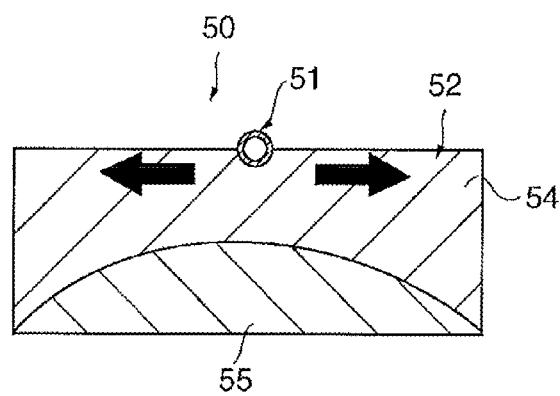
Figure 8:
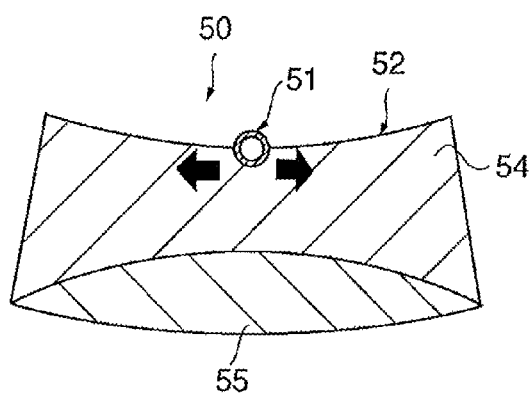

The jointed part 39, as illustrated in FIG. 6, is one obtained by jointing forming edges 42A and 42A of a cutout 42 formed at the back surface 35 of the base 32 at an initial phase. The cutout 42 is formed in a wedge shape by making a cut from a position below the groove 38 along the direction in which the groove 38 extends so as to extend through the inner region 39.

The blood vessel model 30 according to the present embodiment, as indicated by the arrows in FIG. 6, is completed by jointing the forming edges 42A and 42A of the cutout 42 using silicone as in the first embodiment while flexing the opposite end sides in the Figure of the base 32, which are the opposite end sides in the direction in which the simulated blood vessel 11 extends, downward. Here, as a result of the forming edges 42A and 42A of the cutout 42 being jointed, the simulated blood vessel 11 supported by the base 32 enters a state in which a tensile stress acts in the extending direction The simulated blood vessel 11 of the blood vessel model 30 obtained as described above is secured to the base 12 in a state in which a tensile stress in the extending direction acts on the blood vessel wall 14, and thus, when a trainee cuts off the simulated blood vessel 11, parts of the simulated blood vessel 11 separated at the cut part promptly move away from each other, enabling provision of a situation in which the simulated blood vessel 11 is cut off, which is similar to a situation in which, e.g., a real cerebral blood vessel is cut off.

Furthermore, in the present embodiment, also, adjustment of the width and/or depth of the cutout 42 enables fine adjustment of the tensile stress acting on the blood vessel wall 14.

In other respects, the configurations of the respective parts of the device according to each of the embodiments are not limited to the illustrated example configurations, and various alterations are possible as long as such alterations exert effects substantively similar to those of the embodiments.

INDUSTRIAL APPLICABILITY

A blood vessel model for a medical training purpose according to the present invention can be manufactured and sold as a training tool for various procedures for a blood vessel.

DESCRIPTION OF SYMBOLS

10 blood vessel model
11 simulated blood vessel
12 base
24 jointed part
26 cutout
26A forming edge
30 blood vessel model
32 base
38 groove
40 jointed part
42 cutout
42A forming edge
S open space

The invention claimed is:

1. A blood vessel model for medical training comprising a simulated blood vessel artificially formed so as to simulate a blood vessel, and a base supporting the simulated blood vessel,
   wherein the simulated blood vessel includes an exposed circumferential part and another circumferential part buried in the base;
   the base includes a jointed part disposed at a position below the simulated blood vessel; and
   the jointed part is formed by jointing forming edges of a cutout extending along the simulated blood vessel to impart a tensile stress in a diameter-increasing direction to the simulated blood vessel.

2. A blood vessel model for medical training comprising a simulated blood vessel artificially formed so as to simulate a blood vessel, and a base supporting the simulated blood vessel and including a groove that opens on a front surface side thereof,
   wherein the simulated blood vessel is disposed so as to straddle over an open space of the groove, and includes an exposed circumferential part and another circumferential part buried in the base;

the base includes a jointed part disposed at a position below the simulated blood vessel; and the jointed part is formed by jointing forming edges of a cutout extending in a direction across the simulated blood vessel to impart a tensile stress in an extending direction to the simulated blood vessel.

3. A method for manufacturing a blood vessel model for medical training including a simulated blood vessel artificially formed so as to simulate a blood vessel, and a base supporting the simulated blood vessel, the method comprising:

exposing a circumferential part of the simulated blood vessel and burying another circumferential part of the simulated blood vessel in the base; and jointing forming edges of a cutout extending in the base below the simulated blood vessel along the simulated blood vessel to make the simulated blood vessel enter a state in which a tensile stress in a diameter-increasing direction is imparted thereto.

4. A method for manufacturing a blood vessel model for medical training including a simulated blood vessel artificially formed so as to simulate a blood vessel, and a base supporting the simulated blood vessel and including a groove that opens on a front surface side thereof, the method comprising:

exposing a circumferential part of the simulated blood vessel and burying another circumferential part of the simulated blood vessel in the base to dispose the simulated blood vessel so as to straddle over an open space of the groove; and jointing forming edges of a cutout extending in the base below the groove in a direction across the simulated blood vessel to make the simulated blood vessel enter a state in which a tensile stress in an extending direction is imparted thereto.

* * * * *

UNITED STATES PATENT AND TRADEMARK OFFICE
CERTIFICATE OF CORRECTION

PATENT NO. : 8,469,717 B2  Page 1 of 1
APPLICATION NO. : 13/257610
DATED : June 25, 2013
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 99 days.

Signed and Sealed this

Eighth Day of September, 2015

Michelle K. Lee
*Director of the United States Patent and Trademark Office*